(12) United States Patent
Horsnell et al.

(10) Patent No.: US 10,678,595 B2
(45) Date of Patent: Jun. 9, 2020

(54) DYNAMIC SAVING OF REGISTERS IN TRANSACTIONS

(71) Applicant: ARM LIMITED, Cambridge, Cambridgeshire (GB)

(72) Inventors: Matthew James Horsnell, Cambridge (GB); Stephan Diestelhorst, Cambridge (GB)

(73) Assignee: ARM Limited, Cambridge (GB)

( * ) Notice: Subject to any disclaimer, the term of this patent is extended or adjusted under 35 U.S.C. 154(b) by 200 days.

(21) Appl. No.: 15/324,082

(22) PCT Filed: Jun. 11, 2015

(86) PCT No.: PCT/GB2015/051715
§ 371 (c)(1),
(2) Date: Jan. 5, 2017

(87) PCT Pub. No.: WO2016/005723
PCT Pub. Date: Jan. 14, 2016

(65) Prior Publication Data
US 2017/0161112 A1    Jun. 8, 2017

(30) Foreign Application Priority Data
Jul. 11, 2014    (GB) .................................. 1412337.6

(51) Int. Cl.
*G06F 9/50* (2006.01)
*G06F 9/46* (2006.01)
(Continued)

(52) U.S. Cl.
CPC ........ *G06F 9/5027* (2013.01); *G06F 9/30018* (2013.01); *G06F 9/467* (2013.01); *G06F 11/1451* (2013.01); *G06F 9/3004* (2013.01)

(58) Field of Classification Search
USPC ........................................................ 718/104
See application file for complete search history.

(56) References Cited

U.S. PATENT DOCUMENTS 5,210,874 A * 5/1993 Karger ................... G06F 9/4484
                                                        719/328
5,319,395 A * 6/1994 Larky .................... G09G 5/393
                                                        345/605
(Continued)

FOREIGN PATENT DOCUMENTS

CN    102043608 A    5/2011
JP    2012-64086     3/2012

OTHER PUBLICATIONS

Office action dated Dec. 19, 2018 in IL Application No. 249563 (English Translation), 4 pages (Year: 2018).*
(Continued)

*Primary Examiner* — Abu Zar Ghaffari
(74) *Attorney, Agent, or Firm* — Nixon & Vanderhye P.C.

(57) ABSTRACT

A data processing apparatus comprises a plurality of data storage elements, each configured to store data. Mask storage circuitry stores a mask and processing circuitry executes one or more instructions. A data saver is configured, in response to a transactional start instruction, to select a subset of the data storage elements and to save a backup of the subset of the data storage elements. Mask control circuitry then updates the mask to indicate the subset of the data storage elements selected by the data saver. Finally, a monitor detects write or write attempts made to one of the data storage elements not indicated by the mask. Accordingly, a user need not save all data storage elements (e.g. registers) in a system or specify precisely which data storage elements must be saved in order to perform a transaction. Instead, the set of data storage elements that must be saved can be determined and specified dynamically, and the system can respond if an attempt is made to write to a data storage element that has not been saved or backed up.

17 Claims, 5 Drawing Sheets

(51) Int. Cl.
*G06F 9/30* (2018.01)
*G06F 11/14* (2006.01)

(56) References Cited

U.S. PATENT DOCUMENTS

| | | | | |
|---|---|---|---|---|
| 6,006,311 A * | 12/1999 | Arimilli | ................ | G06F 12/126 365/200 |
| 6,249,824 B1 * | 6/2001 | Henrichs | ................ | G06F 3/0616 360/99.22 |
| 6,553,443 B1 * | 4/2003 | Baqai | ................ | H04Q 3/54591 710/260 |
| 6,920,532 B2 * | 7/2005 | Glasco | ................ | G06F 12/082 709/218 |
| 7,050,317 B1 * | 5/2006 | Lien | ................ | G11C 15/00 365/189.05 |
| 7,500,055 B1 * | 3/2009 | Oesterreicher | ....... | G06F 3/0613 711/118 |
| 9,081,501 B2 * | 7/2015 | Asaad | ................ | G06F 15/76 |
| 9,223,701 B2 * | 12/2015 | Piry | ................ | G06F 12/0815 |
| 9,235,251 B2 * | 1/2016 | Gargash | ................ | G06F 1/206 |
| 9,400,650 B2 * | 7/2016 | Plotnikov | ........... | G06F 9/30018 |
| 10,120,684 B2 * | 11/2018 | Orenstien | ........... | G06F 9/30032 |
| 2002/0083312 A1 * | 6/2002 | Sinharoy | ............. | G06F 9/30047 712/240 |
| 2003/0028755 A1 * | 2/2003 | Ohsawa | ................ | G06F 9/3009 712/216 |
| 2004/0117715 A1 * | 6/2004 | Ha | ................ | H03M 13/2771 714/776 |
| 2005/0120185 A1 * | 6/2005 | Yamazaki | ............. | G06F 1/3203 711/147 |
| 2007/0006218 A1 * | 1/2007 | Vinberg | ................ | G06F 8/61 717/174 |
| 2007/0245099 A1 * | 10/2007 | Gray | ................ | G06F 9/3004 711/156 |
| 2010/0318773 A1 * | 12/2010 | Greyzck | ............. | G06F 9/30018 712/223 |
| 2011/0029490 A1 | 2/2011 | Agarwal et al. | | |
| 2011/0093686 A1 | 4/2011 | Penton et al. | | |
| 2011/0191543 A1 | 8/2011 | Craske et al. | | |
| 2012/0030265 A1 * | 2/2012 | Anderson | ........... | G06F 16/1858 707/830 |
| 2012/0072920 A1 * | 3/2012 | Kawamura | ........ | G06F 9/30123 718/108 |
| 2013/0297903 A1 * | 11/2013 | Kaneko | ................ | G06F 3/0605 711/165 |
| 2013/0339642 A1 | 12/2013 | Greiner et al. | | |
| 2013/0339688 A1 | 12/2013 | Busaba | | |
| 2014/0047205 A1 * | 2/2014 | Frey | ................ | G06F 3/0668 711/163 |
| 2014/0189251 A1 * | 7/2014 | Steely, Jr. | ........... | G06F 12/0828 711/141 |
| 2014/0258663 A1 * | 9/2014 | Zeng | ................ | G06F 21/79 711/163 |
| 2015/0170731 A1 * | 6/2015 | Gajapathy | ........... | G11C 7/1009 365/189.02 |
| 2016/0179527 A1 * | 6/2016 | Corbal | ................ | G06F 9/30036 712/5 |
| 2016/0275841 A1 * | 9/2016 | Jin | ................ | G09G 3/2003 |
| 2017/0017488 A1 * | 1/2017 | Plotnikov | ........... | G06F 9/30018 |
| 2017/0046183 A1 * | 2/2017 | Lei | ................ | G06F 9/45504 |

OTHER PUBLICATIONS

International Search Report and Written Opinion of the ISA for PCT/GB2015/051715, dated Sep. 11, 2015, 11 pages.
Search Report for GB 1412337.6, dated Jan. 12, 2015, 3 pages.
Office Action dated Dec. 19, 2018 in IL Application No. 249563 (no English translation available), 10 pages.
European Office Action dated Oct. 2, 2018 in EP Application No. 15729909.0, 6 pages.
Office Action dated Mar. 14, 2019 in JP Application No. 2016-575654 and English translation, 7 pages.
Office Action for IL Application No. 249563 dated Feb. 27, 2020 and English translation, 5 pages.
Office Action dated Mar. 23, 2020 for CN Application No. 201580036625.6 and English translation, 20 pages.

* cited by examiner

DYNAMIC SAVING OF REGISTERS IN TRANSACTIONS

This application is the U.S. national phase of International Application No. PCT/GB2015/051715 filed 11 Jun. 2015, which designated the U.S. and claims priority to GB Patent Application No. 1412337.6 filed 11 Jul. 2014, the entire contents of each of which are hereby incorporated by reference.

TECHNICAL FIELD

The present disclosure relates to the field of data processing and has particular relevance to the use of transactions in a data processing apparatus.

BACKGROUND

In a multiprocessor system, it is often necessary to ensure coordination between the various processing devices. For example, consider the situation in which a processor A and a processor B both attempt to decrement a shared resource (e.g. the value of a person's bank balance) by 10. If the value of the person's bank balance is initially 100 then, processed correctly, the shared value should decrease to 80 (100−10−10). However, if processor A and B each get the current value at the same time, then each of the processors may perform the calculation and write back the new value (90) into shared memory simultaneously. Hence, due to the lack of coordination, one of the two transactions has been masked, or overwritten, by the other transaction.

Locks may be used in order to ensure that only a single execution agent (a processor or thread) can access a shared resource at a time. Considering the above example, the user's bank balance is a shared resource and so a lock may be applied to that data value to ensure that only one processor can read and modify that value at once. If written correctly, such locks can be used to prevent transactions from overwriting each other and to ensure that access to the shared resource is coordinated across all agents. In other words, this helps to prevent the situation in which one agent performs an operation on an old version of the shared resource. A disadvantage to using locks is in the level of granularity that is protected. For example, consider a linked list. In a linked list, each element provides a data value and a pointer to the next element in the list. It is desirable when multiple agents may seek modification access to such a linked list to lock access to the list in order to prevent the situation where one of the elements no longer points to the next element in the list—causing the list to break. One option is to provide a lock for the entire list. However, if one agent wishes to modify the head of a list and another agent wishes to modify the tail of the list, then this lock is unnecessarily restrictive—the edits made by the two agents are unlikely to interfere with each other. Another option is to provide a lock for each individual element of the list. However, this may require a large number of locks in the case of a large list, with each lock requiring its own storage in memory. Locks also have a disadvantage that they can cause deadlocks. For example, if two agents each require access to two shared data resources that are protected by locks, and each of the two agents holds a lock for one of those two shared data resources, then the system enters a deadlock. In other words, neither agent can proceed and will wait forever for the other agent to release the lock that it needs.

One solution is to use transactions rather than locks. When a transaction begins, the processor enters a special execution mode. While in this mode, the system tracks reads and writes. If there is determined to be a conflict (e.g. between multiple agents) then one of the agents will be killed off and rolled back, e.g. its changes will be undone. If no conflicts occur, then the agents continue until they are done, at which time the changes made are committed. Consequently a transaction may be thought of as a series of operations that are treated as a single atomic operation since up until the transaction is committed (a single operation) the entire transaction is invisible to other agents and may even be undone or rewound by that one agent by rolling back.

In some systems, performing transactions may require that every architectural register is saved in order for those registers to be restored to their original values in the case of a rollback. Some architectures may include a significant number of registers and hence, in such systems, it may be necessary to save the values of all of those registers. However, such an approach can be wasteful, since it may involve saving data that is never modified inside the transaction. In this case, the data is stored unnecessarily, thereby consuming both storage space in order to store the values and also time in order to physically copy the data values. Furthermore, if a rollback occurs, then all saved registers must have their values restored, even if those data values have not been modified. Hence, more time may be wasted in restoring all of the stored data values if a rollback occurs. Additionally, the power consumption associated with restoring all those stored data values in the event of a rollback is also preferably avoided.

As an alternative, it is possible for the user and/or the compiler to specify those registers that will be modified during a transaction. In this case, only the specified registers are saved and only those registers will be restored in the event of a rollback. However, it may not always be possible to predict whether or not a particular register will be used in a transaction. For example, a transaction may involve one or more calls to library functions. The user or programmer may have little or no control over such library functions and may not even be able to see how the library functions work. In such cases, the user has no way of knowing which registers must be saved when the transaction starts. Consequently, the user must either save all registers, or else proceed with the possibility that a rollback will fail as a result of an unsaved register being modified.

SUMMARY

Viewed from a first example configuration, a data processing apparatus is provided comprising: a plurality of data storage elements, each configured to store data; mask storage circuitry configured to store a mask; processing circuitry configured to execute one or more instructions; a data saver configured, in response to a transactional start instruction, to select a subset of the data storage elements and to save a backup of the subset of the data storage elements; mask control circuitry configured to update the mask to indicate the subset of the data storage elements selected by the data saver; and a monitor configured to detect a write to one of the data storage elements not indicated by the mask.

According to a second example configuration, there is provided a data processing apparatus comprising: a plurality of means for storing data; mask storage means for storing a mask; processing means for executing one or more instructions; data saving means for, in response to a transactional start instruction, selecting a subset of the plurality of means for storing data and for saving a backup of the data stored by the subset of the plurality of means for storing data; mask control means for updating the mask to indicate the subset of the plurality of means for storing data selected by the data saving means; and monitoring means for detecting a write to one of the plurality of means for storing data not indicated by the mask.

According to a third example configuration, there is provided a method of data processing in a data processing apparatus comprising a plurality of data storage elements for storing data, the method comprising the steps of: selecting a subset of the data storage elements in response to a transactional start instruction; saving a backup of data stored by the subset of the data storage elements; updating a mask to indicate the subset of the data storage elements; and detecting a write to one of the data storage elements not indicated by the mask.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Viewed from a first example configuration, a data processing apparatus is provided comprising: a plurality of data storage elements, each configured to store data; mask storage circuitry configured to store a mask; processing circuitry configured to execute one or more instructions; a data saver configured, in response to a transactional start instruction, to select a subset of the data storage elements and to save a backup of the subset of the data storage elements; mask control circuitry configured to update the mask to indicate the subset of the data storage elements selected by the data saver; and a monitor configured to detect a write to one of the data storage elements not indicated by the mask.

In response to a transactional start instruction, which indicates that a transaction is to begin, the mask storage circuitry saves (backs up) a subset of the data storage elements. These data storage elements may for example be registers in the data processing apparatus. It will be appreciated that such data storage elements may also take the form of register files, shadow register files and various types of memory constructs including, for example, caches and internal scratch pad memories. A mask is then stored that indicates which of the data storage elements have been saved. It should be understood that the word "subset" is used here to mean "less than all" of the full set of data storage elements. During the transaction, the processor executes one or more instructions. A monitor detects write attempts to data storage elements that are not indicated by the mask (i.e. write attempts to data storage elements that have not been saved or backed up). For example, a monitor may examine those instructions that cause writes to the data storage elements or may intercept signals sent by the processing circuitry to the data storage elements. Note that throughout this specification the term "write" is intended to refer to both actual writes to the data storage elements and also requests, from the processor, to write to those data storage elements. If such a write or a write attempt is allowed to proceed then the transaction mechanism itself will have failed, because no rollback will be possible (since a write to a data storage element that cannot be restored will have been made). Hence, the data processing apparatus (by virtue of the monitor) is able to detect such writes and may take suitable action where appropriate. Consequently, it is not necessary to save or back up every single register whenever a transaction is to begin and the user need not be concerned about the possibility of the transaction mechanism failing as a result of a write attempt being made to a data storage element that has not been saved or backed up.

The action taken by the data processing apparatus in response to the detection of an attempt to write to a data storage element not indicated by the mask may take a number of different forms, examples of which are given below, and these may exist either in isolation or in combination.

For example, the data processing apparatus may comprise inhibitor circuitry configured to inhibit the write to the one of the data storage elements not indicated by the mask. In such embodiments, if an attempt is made to write to data storage element that has not been backed up, then the attempt to perform the write may simply be blocked. This may be achieved by the monitor preventing a write request issued by the processor from reaching the data storage elements. In some embodiments, the monitor may also signal to the processor that the write attempt has failed, which may enable the processor to take its own corrective action—for example, by executing an exception handling routine.

As another example, the data processing apparatus may comprise a restorer configured to restore the data storage elements indicated by the mask from the backup. Accordingly, if an attempt is made to write to a data storage element that has not been backed up, all of the data storage elements may be restored to their previous values. In some cases, an updater (for example embodied as updating circuitry) may also update the program counter to indicate the transactional start instruction or an error handler. As a result of turning back the program counter and restoring the data storage elements, a full rollback of the transaction is caused. Hence, the transaction may be forced to begin again. By changing the program counter to indicate an error handler, it is possible to execute special error handling code. This could be used to output diagnostic information.

As a further example, in response to detecting the write to one of the data storage elements not indicated by the mask, the monitor may be configured to signal an error. For example, a signal may be sent to the processor. The processor may have a dedicated subroutine for handling such a situation. Alternatively, the processor may signal an exception and the software itself may comprise an exception handling routine to handle the situation. This may allow complete flexibility regarding how to proceed with the transaction. For example, if the transaction has already failed numerous times then the transaction may simply be rolled back and abandoned. If the failure of the transaction is unimportant (for example, if the data values themselves are not critical) then the software may be allowed to continue without even rolling back. In other cases, the transaction may be rolled back and forced to begin again, this time causing additional registers to be saved.

The data storage elements may be selected by the data saver based on a heuristical (e.g. experience based) analysis carried out by the data processing apparatus. In particular, by using heuristics or statistics, the data saver may select those data storage elements to be saved (backed up). In such cases, it may be unnecessary for the programmer to explicitly state those data storage elements that must be backed up, which reduces a burden on the programmer and may be suitable for use when libraries are being invoked by the programmer and where it is not clear to the programmer which data storage elements must be backed up.

The heuristical analysis may be dependent on data annotated by a compiler. For example, during compilation, the compiler may provide hints (i.e. indications) that can be used by the data saver to determine which data storage elements should be saved.

The heuristical analysis may be dependent on calling conventions associated with the one or more instructions. A calling convention may be dictated by a particular architecture and may specify how data should be exchanged between the caller and the callee in a function call. In particular, calling conventions may indicate how parameters are to be passed (e.g. using particular data storage elements or the stack) and how results are to be returned. This information can be useful in predicting those data storage elements that must be saved, or are likely to have to be saved, prior to starting a transaction.

The heuristical analysis may be dependent on the number of times that the monitor has detected a write to one of the data storage elements not indicated by the mask. For example, if a transaction is repeatedly rolled back as a consequence of writes to registers that have not been saved, then the data storage elements selected by the data saver for saving may be varied, in order to seek to reduce the chance that a future transaction will rollback. For example, the subset of data storage elements that is selected may be increased in response to the monitor detecting the write to the one of the data storage elements not indicated by the mask. For example, every time the monitor detects an attempt to write to a data storage element that has not been saved, a rollback may occur and an additional register may be saved as compared to the previous iteration. In other embodiments, the number of registers that are saved may increment more quickly in order to limit the number of rollbacks that occur. However, this must be balanced against the increased risk of unnecessarily saving registers.

The subset of data storage elements to be saved may be selected by the data saver in response to a subset defining instruction. For example, the user may provide a "best guess" regarding which data storage elements should be saved. Such an approach may be useful as an initial starting point for determining which data storage elements to be backed up. Such an approach may be particularly useful if the user has acquired knowledge of the workings of a library that is being invoked.

The data storage elements may be a plurality of registers.

The monitor may comprise monitoring circuitry. The monitoring circuitry may intercept signals issued by the processor to the data storage elements. In other embodiments, the monitor may be implemented by monitoring software and may monitor the instructions that are executed in order to determine whether an instruction will cause a write to a data storage element that has not been saved (i.e. that is not part of the mask) before the processor executes that instruction.

The data saver may comprise data saving circuitry, i.e. particular circuitry configured to perform the described data saving function. However, the data saver may be implemented by data saving software that explicitly causes the data storage elements to be backed up or saved to a particular location.

The data saver may be configured to save a backup of the subset of the data storage elements to a local cache. By using a local cache, it is possible to isolate the changes made by other agents until such time as the changes are committed. This is important because until the changes are committed, the changes must not be seen by other agents. This isolation can be achieved by using a local cache and by providing a suitable tag on the associated cache line entry to indicate that it should not be allowed to be retrieved by other processors.

In some embodiments, the mask indicates both a set of registers to be saved and a set of registers to be unsaved; and wherein the data storage elements are selected by the data saver by including storage elements identified in the set of registers to be saved and excluding storage elements identified in the set of registers to be unsaved. Accordingly, it is possible to indicate a set of registers whose values will not be saved. However, since those registers are still indicated by the mask, writing to those registers will not cause any special behaviour to occur. Such registers can therefore be used for communication purposes, for example to the outside world.

Figure 1:
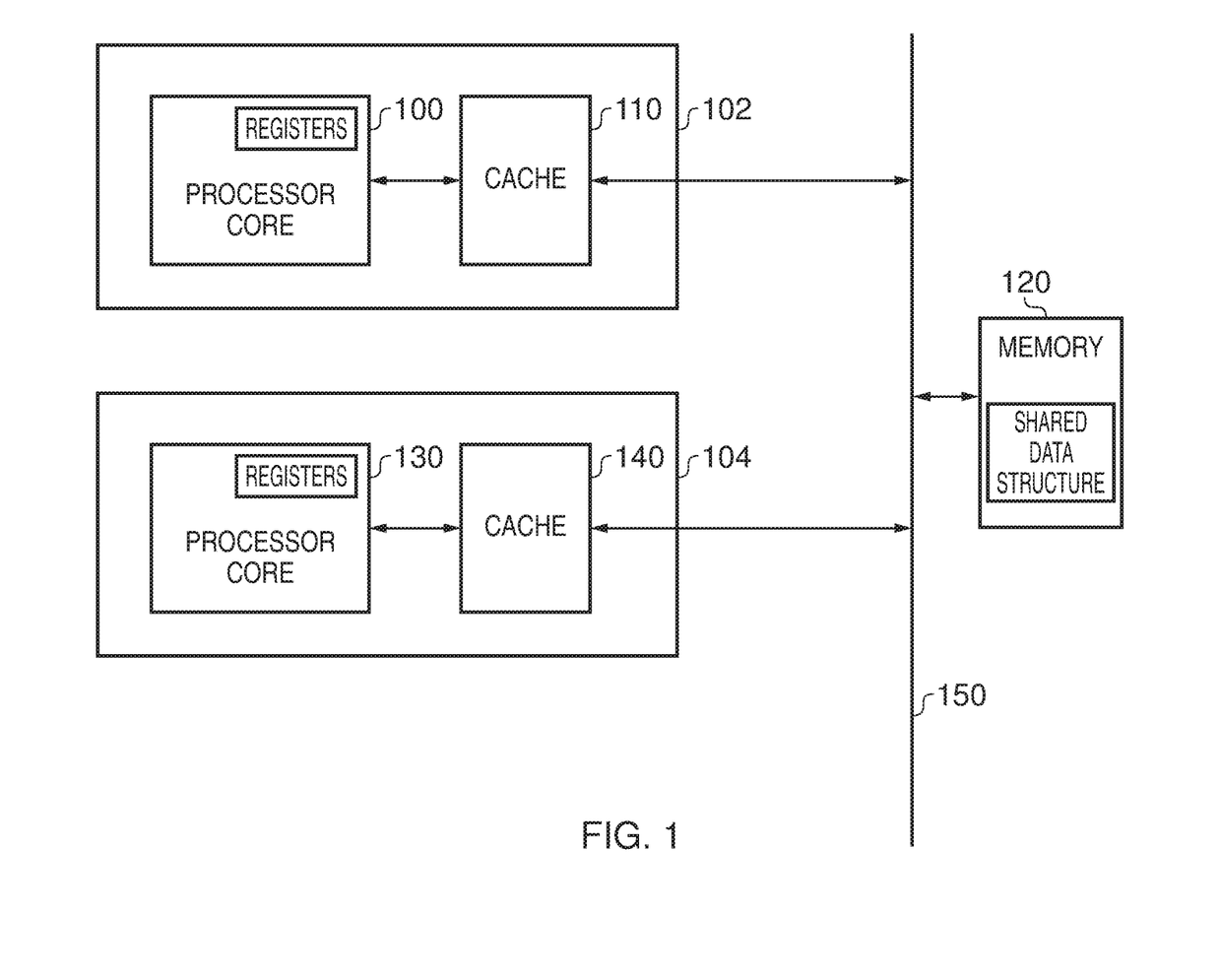
FIG. 1 is shows an overview of a system comprising a data processing apparatus in one embodiment.

FIG. 1 shows a system comprising two data processing apparatuses 102, 104 each comprising a respective processor core 100, 130 and each with an associated set of registers that is local to that processor core. Each of the processor cores 100, 130 also has an associated local cache 110, 140. In other words, one processor core may not access the cache associated with the other processor core. Each of the caches 110, 140 may communicate with each other (for coherency purposes) and a shared memory 120 via a memory bus 150. The shared or main memory 120 comprises one or more shared data structures (shared resources) that can be accessed by the processor cores 100, 130. Since each of the processors cores 100, 130 can access the same shared data structure held in main memory 120, the system uses transactions in order to provide coordination between the processor cores and to help prevent a modification by one processor core being "overwritten" by a modification made by another processor core.

Figure 2:
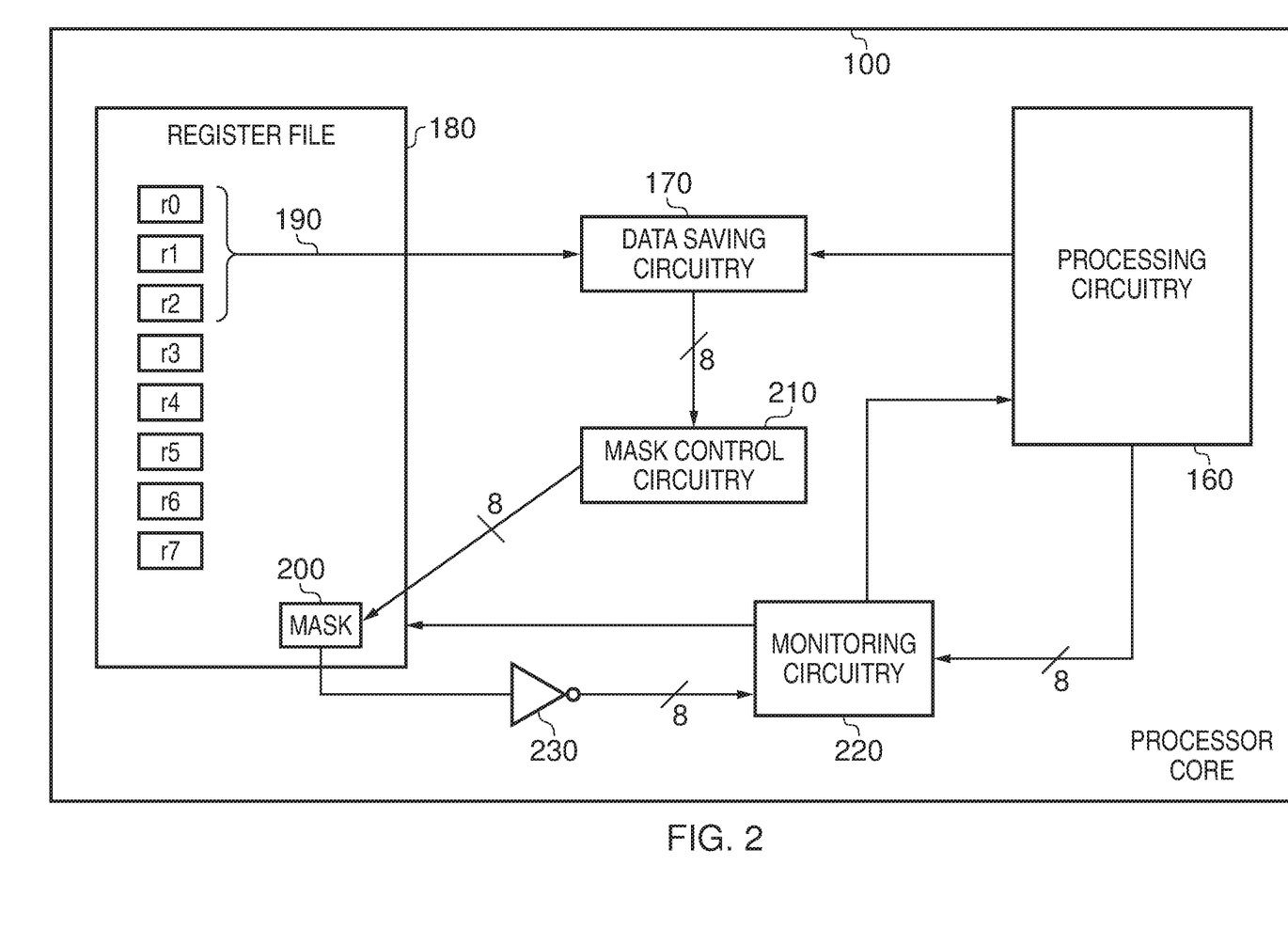
FIG. 2 shows a circuit diagram illustrating the components that make up the data processing apparatus in one example embodiment.

FIG. 2 shows an embodiment of the processor core 100. Processing circuitry 160 executes data processing instructions. One of those instructions may be used to indicate that a transaction is to begin. In response to receiving such instruction, the processing circuitry 160 signals the data saving circuitry 170 to save a subset of registers 190 in a register file 180. A mask 200 is also updated by mask control circuitry 210 to represent the subset of registers 190. In this example, the subset 190 comprises registers r0, r1, and r2. Accordingly, the mask may contain the value 11100000, thereby indicating that the subset comprises the first three registers out of the eight registers in the register file 180. Of course, it will be appreciated that in a register file comprising a large or different number of registers, the size of the mask will be appropriate in order to reflect which of the registers comprise the subset of registers that has been saved by the data saving circuitry 170. Processor core 100 also comprises monitoring circuitry 220 that (functionally) lies between the processing circuitry 160 and the register file

180. The monitoring circuitry 220 intercepts write requests issued by the processing circuitry 160 to the register file 180. In other words, if the processing circuitry 160 sends a signal to write to a register in the register file 180, then this signal will be firstly received by the monitoring circuitry 220. The monitoring circuitry 220 will then make a comparison to the set of registers that have not been saved by the data saving circuitry by inverting, by means of inverter 230, the mask 200. If the write request issued by processing circuitry 160 and received at monitoring circuitry 220 is not to one of the registers that have been saved by the data saving circuitry 170, then the monitoring circuitry reacts. For example, in this embodiment, the monitoring circuitry signals a warning to the processing circuitry 160. If, however, the write request (signal) issued by the processing circuitry 160 is to one of the registers that have been saved by the data saving circuitry 170, then the request may be allowed to proceed by the monitoring circuitry 220 to the register file 180 in order for the write to complete.

In some other embodiments, the mask may additionally identify a set of registers that are to be unsaved (i.e. not saved). Such registers are not saved by the data saving circuitry 170, however, since these registers are still identified by the mask, the monitoring circuitry 220 will not react if these registers are written to. These registers are not backed up, but can be written to without the monitoring circuitry 170 executing some special behaviour (such as raising an error, aborting, or restarting). Such registers may therefore be used for communication such as to the outside world. For example, an aborting transaction may use such a register to communicate why the transaction is being aborted.

In these embodiments, a register may therefore fall into one of three different cases. In the first case, the register may be indicated by the mask as a register to be saved. Such registers are backed up and can be rolled back if necessary. In the second case, the register may not be indicated by the mask at all. If such a register is written to during a transaction, then some kind of special behaviour may be initiated by the monitoring circuitry 170. For example, the transaction may abort, the system may restart, or an error may be raised, etc. In the third case, the register may be indicated by the mask as being an unsaved register. Such registers are not backed up and cannot be rolled back. However, if such a register is written to, the monitoring circuitry 170 will not take special action.

Figure 3:
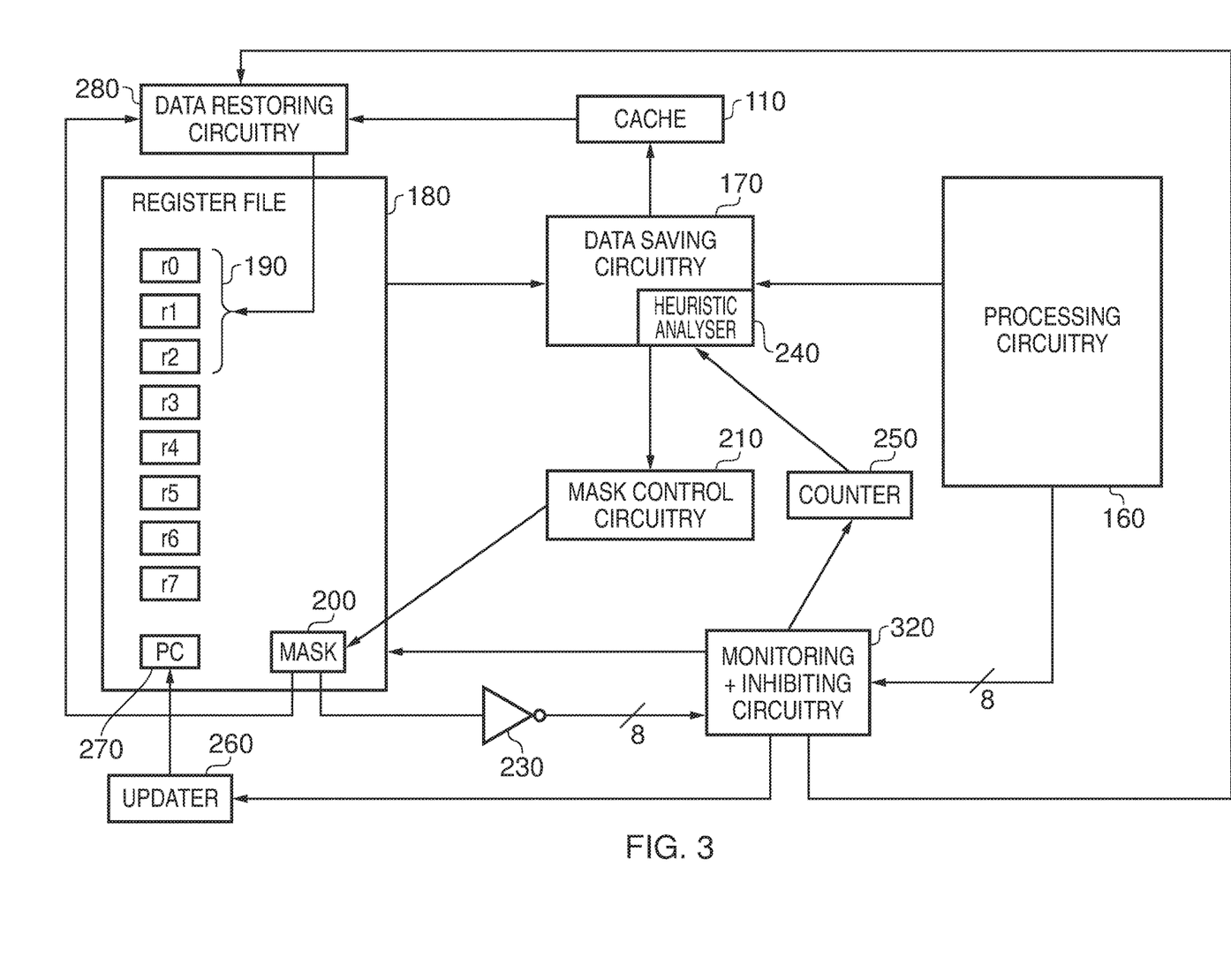
FIG. 3 shows a circuit diagram illustrating the components that make up the data processing apparatus in another example embodiment.

FIG. 3 shows an embodiment of a data processing apparatus 102 comprising a processor core 100 and a local cache 110. The same reference numerals have been used to indicate features that have already been described.

In the embodiment illustrated, the data saving circuitry 170 comprises a heuristic analyser 240. The heuristic analyser monitors the ongoing success or failure of the data saving circuitry in its selection of the subset of registers 190 that are to be saved or backed up to the local cache 110. There are a number of different heuristics or statistics that may be considered by the heuristic analyser 240 when determining the subset 190. For example, this embodiment considers a heuristic based on the number of times that the monitoring circuitry intercepts an attempt by the processing circuitry 160 to write to a register in the register file 180 that is not part of the subset 190. In particular, a counter 250 is incremented every time the processing circuitry 160 attempts to write to a register in the register file 180 that has not been saved to the cache (i.e. a register that is not part of the subset 190). When the data saving circuitry 170 determines the registers that should be saved, the value of the counter 250 is taken into account. In this way, as more requests are made by the processing circuitry 160 to write to registers in the register file 180 that have not been saved, the data saving circuitry 170 will respond by saving a larger subset of registers.

The heuristic analyser 240 can also consider heuristics such as the calling conventions associated with the instructions executed by the processing circuitry 160. Calling conventions dictate the method and manner in which data is passed between a caller and a callee during a function call. For example, the calling convention may dictate that parameters are passed using a particular combination of registers, or using the stack. Similarly, the calling convention may indicate how the result of a function call is to be returned. This information can be used in order to better predict the registers which are more likely to be written to by the processing circuitry 160. For example, if the calling conventions indicate that a first parameter is always passed using a register r0, then it is more likely that a register r0 is likely to be written to at some point by the processing circuitry 160. Hence, the heuristic analyser 240 may determine that register r0 should always form part of the selected subset.

A further example of a heuristic considered by the heuristic analyser may be hints provided by the compiler during compilation of source code into instructions for the processing circuitry 160. Since the complier has visibility of the source code, the complier may be in a position to provide a good indication of those registers that must be saved by the data saving circuitry 170. Note, however that this is not always possible, since source code may reference a library or external code source that is not visible to the complier. Accordingly, the hints provided by the compiler may not always be complete.

Similarly, a compiled application may give an indication of registers that should not be saved by the data saving circuitry 170. This may either be used to override the heuristics or statistics gathered by the heuristic analyser 240 or the data saving circuitry 170 may be configured to save all registers except those indicated by the compiled application.

It should be appreciated that various different heuristics, including further examples not explicitly mentioned here but known to the skilled person, may be considered by the heuristic analyser 240 in any combination. The heuristic analyser 240 may also combine the different heuristics in various ways in order to produce a final conclusion regarding the subset of registers 190 that are to be saved.

Monitoring and inhibiting circuitry 320 is provided to monitor the attempts of the processing circuitry 160 to write to the register file 180. The monitoring and inhibiting circuitry 320 is configured such that as well as monitoring write requests from the processing circuitry 160 to the register file 180, a signal sent by the processing circuitry 160 to the register file 180 that relates to a register that has not been saved (backed up) by the data saving circuitry 170 is inhibited. In other words that signal is disregarded and is not forwarded to the register file 180.

Additionally, in response to detecting a write request to a register in the register file 180 that has not been saved by the data saving circuitry 170, a program counter 270 held within the register file 180 is updated by an updater 260. The program counter 270 is used to indicate the instruction that is next to be executed by the processing circuitry 160. Accordingly, by updating the program counter 270 using the updater 260, it is possible to restart a transaction or to skip over the transaction altogether if the monitoring and inhibiting circuitry 320 detects that the processing circuitry 160 is attempting to write to a register that is not part of the subset 190. In this embodiment, data restoring circuitry 280 is also provided so that if an attempt is made to write to a register that is not part of the subset 190, then those registers that have been saved are restored from the cache. In other words, the registers that were backed up are reset to their original values. By means of the data restoring circuitry 280 and the updater 260, it is thus possible to effect a rollback. That is, in response to the monitoring and inhibiting circuitry 320 detecting that the processing circuitry 160 is attempting to write to a register that is not part of the subset 190 (i.e. that has not been saved), the write request is inhibited by the monitoring and inhibiting circuitry 320, the program counter 270 is reset by the updater 260 to the value of the instruction at which the transaction began, and the data restoring circuitry 280 restores the values of the subset of registers 190 to the values that those registers had at the time that the transaction began. In other words, the state of the data processing apparatus is reset to point at which that transaction began. In other embodiments, in response to the monitoring and inhibiting circuitry 320 detecting that the processing circuitry 160 is attempting to write to a register that is not part of the subset 190, the program counter may be updated to refer to an error handling routine. Such an error handling routine may define special behaviour to be performed when an attempt is made to write to a register that is not part of the subset 190.

Figure 4:
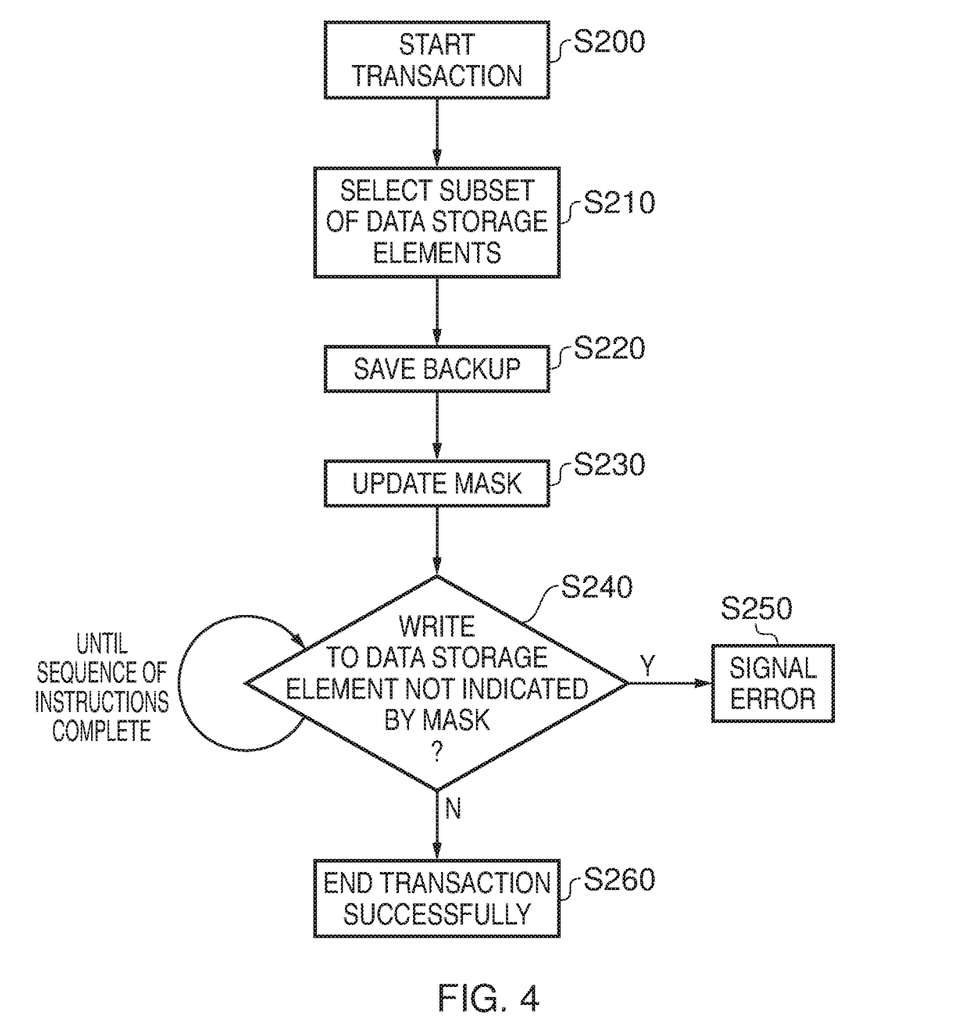
FIG. 4 shows, in flow chart form, a method of using the data processing apparatus in accordance with one embodiment.

FIG. 4 shows, in flowchart form, a method of executing transactions in accordance with one embodiment. At step S200, a transaction begins. This may occur as a result of the processing circuitry 160 receiving a transactional start instruction. However, the transaction may also be initiated by hardware if particular conditions are met. At step S210, a subset of data storage elements is selected. The data storage elements may be, for example, registers in a register file 180. There are many ways in which the set of data storage elements may be selected. One way of selecting these is by the use of heuristics, which will be demonstrated later with respect to FIG. 5. However the data storage elements are selected, a backup is made at step S220. In some examples, the backup may be achieved by writing the values of those data storage elements into a cache 110. However, it will be appreciated that other forms of data storage may be equally acceptable. A mask 200 is then updated in order to reflect the subset of data storage elements that have been saved at step S230. The transaction then proceeds by the processor circuitry executing one or more instructions. If at any stage during that sequence of instructions, a write or write attempt is made to a data storage element not indicated by the mask, then this is detected at step S240 and the flow proceeds to step S250 where some action is performed. In this embodiment, an error is signalled. However, it will be appreciated that other responses may be appropriate or utilized in other embodiments. For example, a rollback may be performed, involving altering a program counter 270 and/or restoring the value of the subset of data storage elements as previously discussed. Various other alerting or remedial actions may be taken, which will be apparent to the skilled person. Alternatively, if the data processing apparatus does not detect a write to a register that is not indicated by the mask (i.e. a register that has not been saved or backed up) during the transaction, then the transaction ends successfully at step S260.

Figure 5:
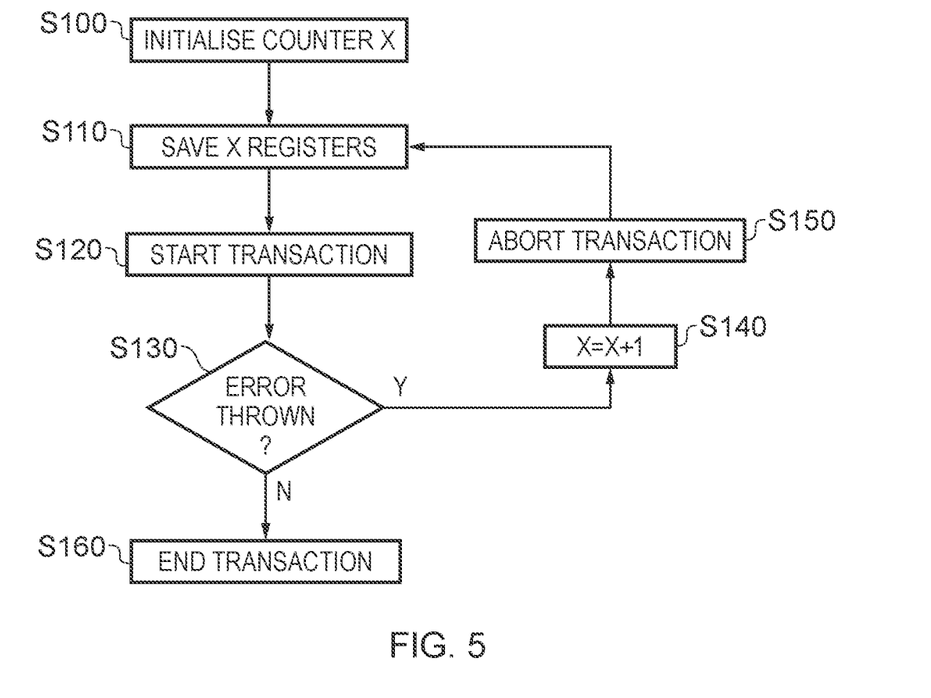
FIG. 5 is a flow chart that indicates how heuristics may be used in order to select the set of registers that are saved at the start of a transaction.

FIG. 5 shows, in flow chart form, the use of a heuristic in selecting the subset of data storage elements. In this example, the data storage elements are considered to be registers that form part of a register file 180. The process begins at step S100 when a transactional start instruction is executed by the processor. This causes an initial value of x to be initialised or set. In this example, the initial value of x is based on heuristics. In particular, x relates to a counter that is incremented every time an error is thrown as a result of a write request being issued by processing circuitry 160 to a register in the register file 180 that has not been saved or backed up. Having determined the value of x, the set of x registers is saved at step S110. For example, the set of x registers 190 may be saved to a local cache 110. The set of x registers 190 is in part determined by using knowledge of the calling conventions of instructions executed by processing circuitry 160. In particular, if the calling convention indicates that parameters and return results are always passed using registers in ascending order from r0 to r8 then the heuristic may determine that the set of x registers starts with register r0 and additional registers are added sequentially until x registers have been added. In other embodiments, other heuristics may be used to determine how the set of registers is expanded. Either before or after the registers are saved, a mask 200 is updated in order to reflect the set of registers that have been backed up. At step S120 the transaction begins. During this step, a sequence of instructions may be executed by the processing circuitry 160. However, at any time until the transaction is committed (i.e. completed), the value of the registers saved at step S110 can be restored by rolling back. At step S130, it determined whether or not an error has occurred. In particular, step S130 continually tests whether at any stage during the transaction, an attempt is made by the processing circuitry 160 to write to one of the registers in the register file 180 that is not part of the subset of registers 190 that were saved in step S110. Such an error may be raised by the monitoring circuitry 220 or monitoring and inhibiting circuitry 320. If no such attempt is made during the transaction, then the transaction ends at step S160. The end of the transaction may take place implicitly as a result of reaching the end of a block of code, or may occur explicitly with an end transaction instruction. When the transaction ends, the values of the registers are saved back to main memory so that other processor cores may access the newly updated values. Alternatively, if at step S130 an error is thrown, then the process proceeds to step S140. At step S140, the value of x is incremented by 1 thereby causing the next highest register that was unsaved to be saved.

It will be appreciated that in other embodiments, x may be incremented by more than one. This may cause fewer iterations of the loop to occur. However, it may take place at the cost of more registers being saved that is actually necessary.

In some other embodiments, the identity of erroneously accessed register(s) may be recorded such that those registers will be specifically saved next time the transaction is started. This may be achieved, for example, at step S140, by directly modifying the mask.

In any event, at step S150, the transaction is aborted. In this embodiment, this causes the program counter 270 to be updated by the updater 260 to the value of the program counter at the time the transactional start instruction was executed by the processing circuitry 160. Additionally, the values of the set of registers 190 are restored to the values that were saved in the previous execution of step S110. In other words the transaction is rolled back, in that the transaction is restarted from its beginning and the values of the subset of registers 190 will be restored to the values held by those registers at the time the transactional start instruction was received. Flow then proceeds to step S110 where the transaction begins again, and the set of x registers is saved once more.

Hence, it can be seen that in overall summary, an initial estimate of the set of x registers is made. A transaction then proceeds. However, if the transaction fails as a result of write attempt being made by the processing circuitry 160 to a register in the register file 180 that is not part of the subset of registers 190 (i.e. if a write attempt is made to a register that has not been saved at the time of the transaction starting), then an error is thrown, the transaction is rolled back and the set of x registers is expanded. The transaction is then restarted with this new set of registers. This process may proceed until the transaction ends successfully at step S160. There is, thus, no need either to explicitly state the set of registers that must be saved, which may be unknown, or to save the entire set of architectural registers.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
   a plurality of data storage elements, each configured to store data;
   mask storage circuitry configured to store a mask;
   processing circuitry configured to execute one or more instructions;
   a data saver configured, in response to a transactional start instruction, to select a subset of the data storage elements and to save a backup of the subset of the data storage elements;
   mask control circuitry configured to update the mask to indicate the subset of the data storage elements selected by the data saver; and
   a monitor configured to detect a write to one of the data storage elements not indicated by the mask, wherein
   the data storage elements are selected by the data saver based on a heuristical analysis carried out by the data processing apparatus; and
   the heuristical analysis is dependent on at least one of: data annotated by a compiler, and calling conventions associated with the one or more instructions.

2. The data processing apparatus according to claim 1, comprising:
   inhibitor circuitry configured to inhibit the write to the one of the data storage elements not indicated by the mask.

3. The data processing apparatus according to claim 2, comprising:
   a restorer configured to restore the data storage elements indicated by the mask from the backup.

4. The data processing apparatus according to claim 3, comprising:
   updating circuitry configured to update a program counter to point to the transactional start instruction or an error handler.

5. The data processing apparatus according to claim 1, wherein the monitor is additionally configured to signal an error in response to detection of the write to the one of the data storage elements not indicated by the mask.

6. The data processing apparatus according to claim 1, wherein the heuristical analysis is dependent on a number of times the monitor has detected a write to one of the data storage elements not indicated by the mask.

7. The data processing apparatus according to claim 1, wherein the subset of the data storage elements selected is increased in response to the monitor detecting the write to the one of the data storage elements not indicated by the mask.

8. The data processing apparatus according to claim 1, wherein the subset of the data storage elements is selected by the data saver in response to a subset defining instruction that causes the subset of data storage elements to be defined.

9. The data processing apparatus according to claim 1, wherein the plurality of data storage elements is a plurality of registers.

10. The data processing apparatus according to claim 1, wherein the monitor comprises monitoring circuitry.

11. The data processing apparatus according to claim 1, wherein the monitor is implemented by monitoring software executable by a data processor.

12. The data processing apparatus according to claim 1, wherein the data saver comprises data saving circuitry.

13. The data processing apparatus according to claim 1, wherein the data saver is implemented by data saving software executable by a data processor.

14. The data processing apparatus according to claim 1, wherein the data saver is configured to save the backup of the subset of the data storage elements to a local cache.

15. The data processing apparatus according to claim 1, wherein the mask control circuitry is configured to update the mask to indicate the subset of the data storage elements selected by the data saver and to indicate a subset of the data storage elements not selected by the data saver.

16. A data processing apparatus comprising:
   a plurality of means for storing data;
   means for storing a mask;
   means for executing one or more instructions;
   means for, in response to a transactional start instruction, selecting a subset of the plurality of means for storing data and for saving a backup of the data stored by the subset of the plurality of means for storing data;
   means for updating the mask to indicate the subset of the plurality of means for storing data selected by the means for selecting and saving; and
   means for detecting a write to one of the plurality of means for storing data not indicated by the mask, wherein
   the plurality of means for storing data is selected by the means for selecting a subset based on a heuristical analysis carried out by the data processing apparatus; and
   the heuristical analysis is dependent on at least one of: data annotated by a compiler, and calling conventions associated with the one or more instructions.

17. A method of data processing in a data processing apparatus comprising a plurality of data storage elements for storing data, the method comprising the steps of:
   selecting a subset of the data storage elements in response to a transactional start instruction;

saving a backup of data stored by the subset of the data storage elements;
updating a mask to indicate the subset of the data storage elements; and
detecting a write to one of the data storage elements not indicated by the mask, wherein
the data storage elements are selected based on a heuristical analysis carried out by the data processing apparatus; and
the heuristical analysis is dependent on at least one of: data annotated by a compiler, and calling conventions associated with the one or more instructions.

* * * * *